April 13, 1965  D. P. CLOCK ETAL  3,178,705
DECODERS FOR TRANSPONDERS OR THE LIKE
Filed Oct. 6, 1961  5 Sheets-Sheet 4

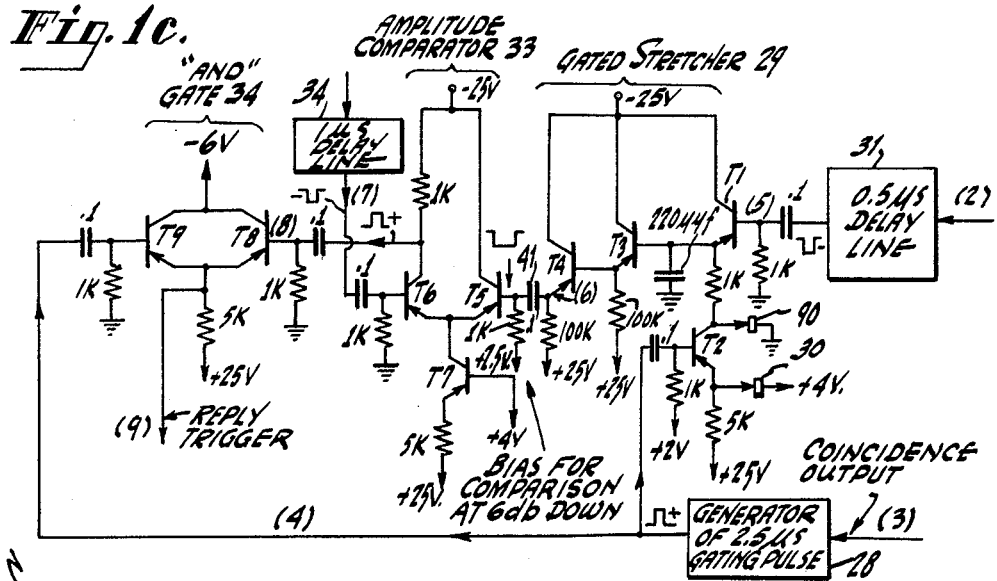
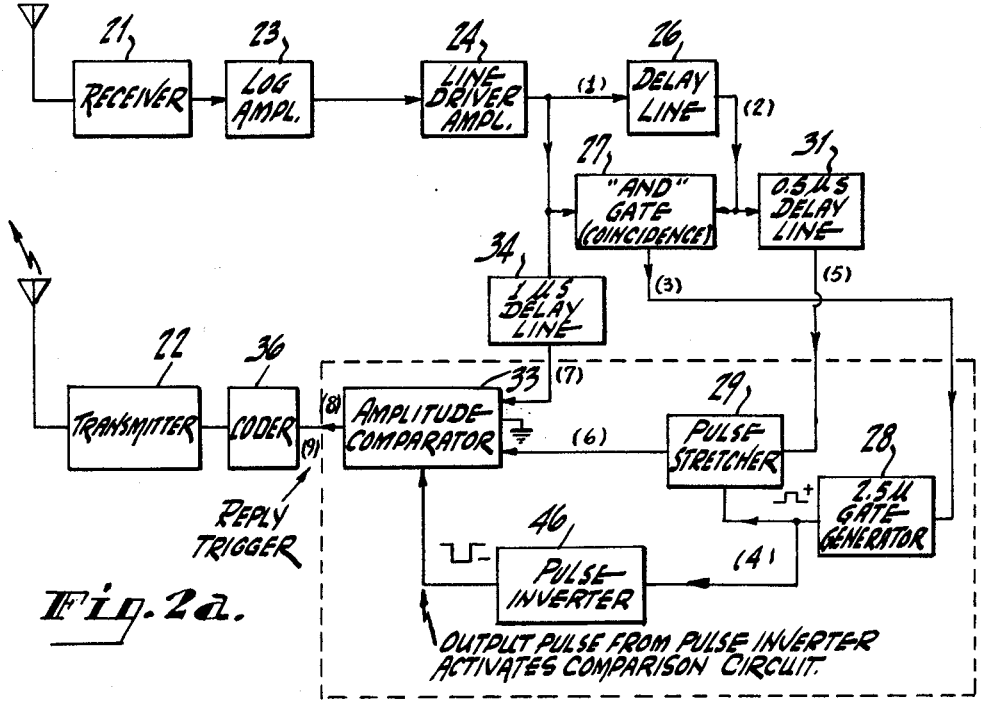

INVENTORS
JOHN H. PRATT &
DONALD P. CLOCK
BY
Floyd M. Harris
Attorney

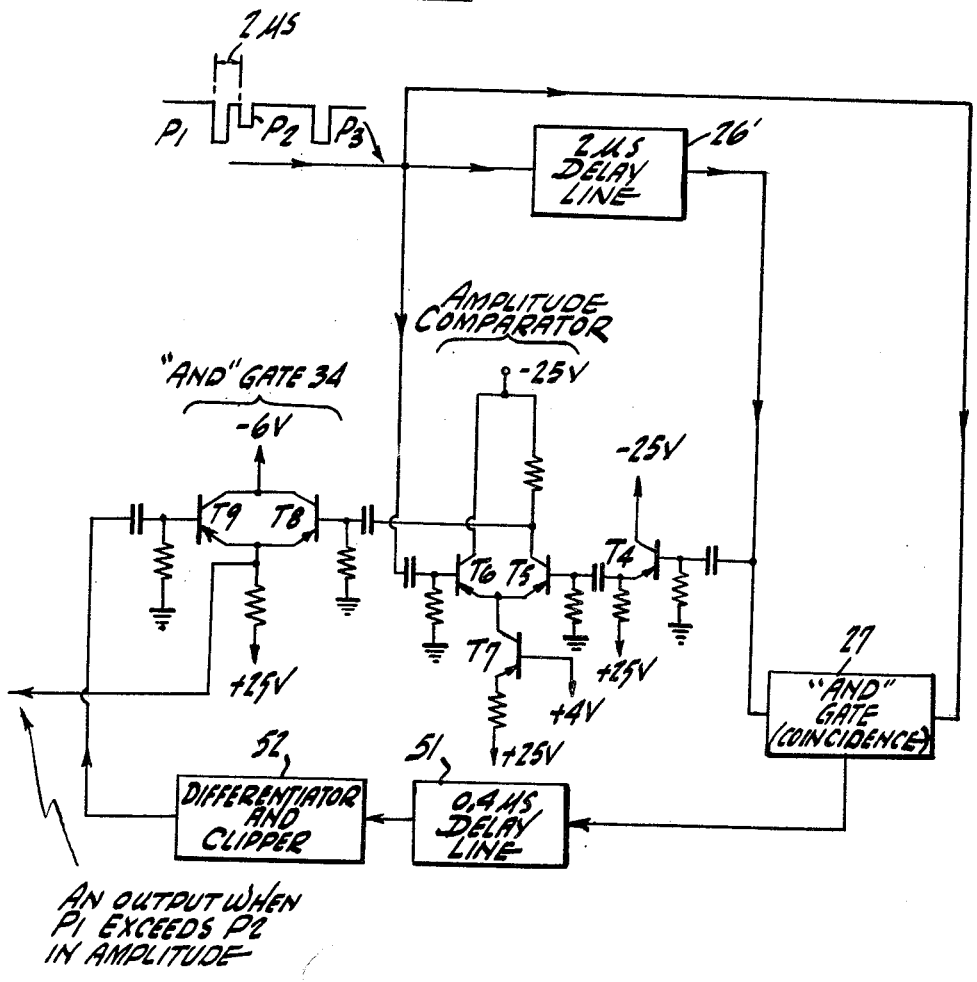

3,178,705
DECODERS FOR TRANSPONDERS OR THE LIKE
Donald P. Clock, Granada Hills, and John H. Pratt, Woodland Hills, Calif., assignors to Radio Corporation of America, a corporation of Delaware
Filed Oct. 6, 1961, Ser. No. 143,385
16 Claims. (Cl. 343—6.8)

This invention relates to improved decoders for transponders or the like, and particularly to improved decoders providing improved discrimination against false interrogations such as sidelobe interrogations and such as might result from undesired signals such as echoes.

Airborne beacons or transponders commonly receive undesired echoes produced by reflections from the ground, buildings or other aircraft. Such an echo may occur at such a time that it is not distinguishable from the second pulse of an interrogation pulse code pair so far as its timing is concerned. However, it generally may be distinguished by amplitude comparison because an echo is nearly always of less amplitude than an interrogation pulse. Also, by the use of different antenna patterns for the two pulses of a code pair, the interrogator may insure that the second pulse of a sidelobe interrogation is of lower amplitude than the first pulse. In accordance with the invention the decoder makes a time coincidence comparison of two spaced pulses of the received interrogation signal, and also makes an amplitude comparison of these two pulses. There is an output from the decoder only when the two pulses have both the correct time spacing and the correct relative amplitudes. One feature of the present invention is that the means used to prevent replies to echoes and sidelobe interrogations does not allow interfering pulses to cause the introduction of "deadtime" during which the transponder cannot reply to valid interrogations. Such interfering pulses may, for example, be received from non-coded radars and from interrogating radars transmitting pulses on a code spacing differing from that of the interrogating radar to which it is desired to reply.

The invention will be described, by way of one example, as applied to an airborne transponder which is interrogated from the ground by a two pulse code consisting of pulses $P_1$ and $P_3$ spaced apart by a certain code time such as 8 microseconds. Also, in this example, for the purpose of sidelobe suppression, the pulse $P_1$ is transmitted from an omni-directional antenna, and the pulse $P_3$ is transmitted from a directional antenna. The decoder is to supply an output pulse or reply trigger only when the two pulses have the preselected time spacing (such as 8 microseconds) and also only when the pulse $P_3$ has a greater amplitude than the amplitude of some selected fraction of the amplitude of pulse $P_1$.

In one example of a decoder embodying the invention, the interrogation pulse code is supplied delayed and undelayed to the two input circuits, respectively, of a coincidence circuit so that a coincidence output pulse is produced when a pair of pulses have the predetermined time spacing. The interrogation pulse code is also supplied delayed and undelayed to the two input circuits, respectively, of an amplitude comparator so that the amplitudes of the two pulses are compared to produce an output pulse when the two pulses have a predetermined amplitude relation. Means is provided to supply the output pulse of the amplitude comparator to the output lead of the decoder only in response to the occurrence of a coincidence output pulse.

In order to make a proper amplitude comparison, the two pulses should be at their correct individual amplitudes at the time of the comparison. In one embodiment of the invention this is accomplished by stretching the pulse $P_1$ so that a full amplitude stretched pulse $P_1$ is at the comparator when the pulse $P_3$ appears at the comparator. In another embodiment of the invention this is accomplished by applying both pulses to the comparator without any pulse stretching, and sampling the output of the comparator for a short period during the time the pulses are being compared. In both embodiments no output signal will be supplied from the amplitude comparator to the output lead of the decoder unless the pulses have the correct spacing and the correct relative amplitudes.

The invention will be described in detail with reference to the accompanying drawing in which:

FIG. 1b is a set of graphs that are referred to in describing the operation of the apparatus of FIG. 1a;

FIG. 1c is a block and circuit diagram showing details of portions of the apparatus of FIG. 1a;

FIG. 2a is a block diagram of a transponder embodying a decoder constructed in accordance with another embodiment of the invention;

FIG. 2b is a block and circuit diagram showing details of portions of the apparatus of FIG. 2a;

FIG. 3b is a set of graphs that are referred to in describing the operation of the apparatus of FIG. 3a;

FIG. 3c is a block and circuit diagram showing details of portions of the apparatus of FIG. 3a; and FIG. 4 is a block and circuit diagram illustrating another embodiment of the invention.

In the several figures like parts are indicated by similar reference characters.

Figure 1A:
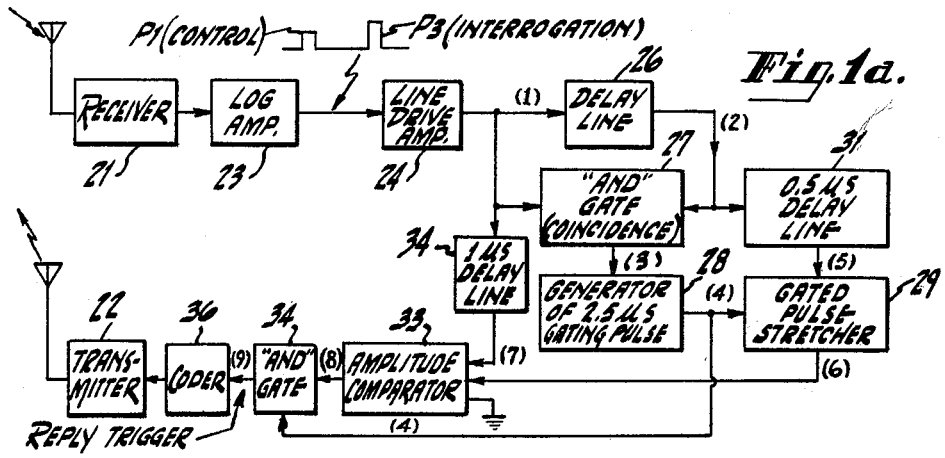
FIG. 1a is a block diagram of a transponder embodying a decoder constructed in accordance with one embodiment of the invention.

FIG. 1a shows an embodiment of the invention as applied to a transponder which comprises a receiver 21 that receives the interrogation signal, and a transmitter 22 that transmits the reply. The receiver 21 supplies an intermediate frequency signal to a logarithmic amplifier 23 where it is amplified and demodulated to supply video signal to a line driver amplifier 24. In the specific example being described the output of the log amplifier 23 is about 0.4 volt per decibel of input signal over the range of input signal amplitudes to be received. Also, in this example it is assumed that the interrogation signal consists, as previously stated, of the pulses $P_1$ and $P_3$ having a code spacing of 8 microseconds. There usually will be received with the interrogation signal some interfering pulses and some interrogation signals having other code spacings.

Figure 1B:
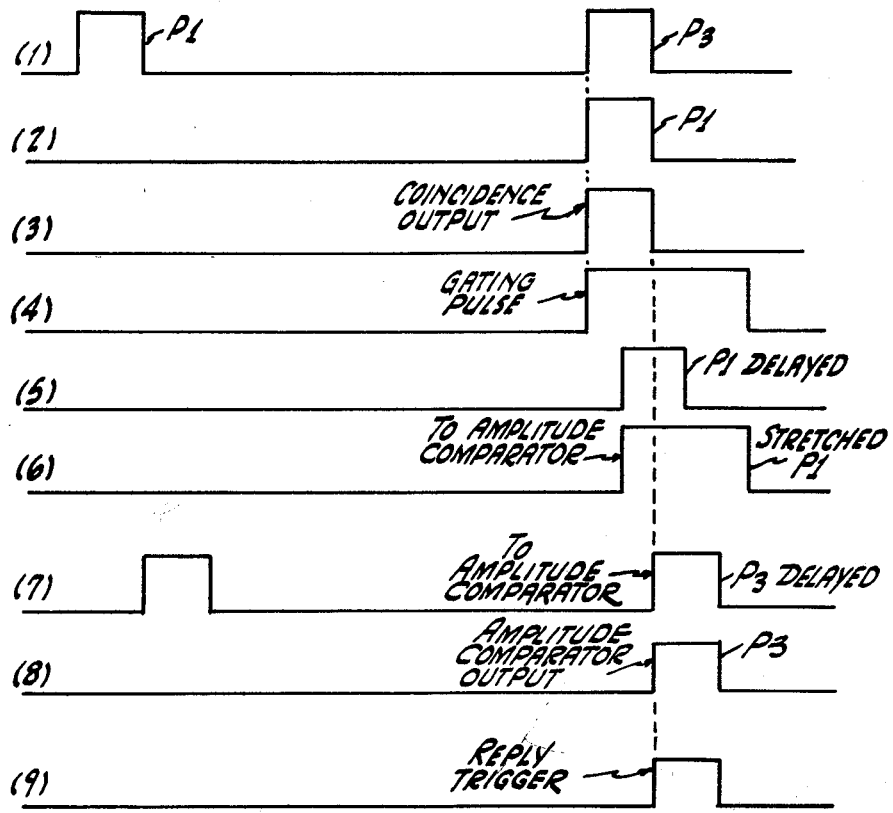

Referring now to FIGS. 1a and 1b, FIG. 1b shows the voltage wave forms or signals (1) through (9) that appear at various points in the circuit of FIG. 1a. The points at which they appear in FIG. 1a are indicated by numerals in parentheses corresponding to those identifying the line illustrating the corresponding signals in FIG. 1b. For the sake of clarity, all the pulses are shown as having the same polarity in FIG. 1b. In the actual circuit, the pulse polarities differ from one point to another. The signal (1), comprising pulses $P_1$ and $P_3$, is applied to a delay line 26 which delays the signal by the amount of the code spacing, 8 microseconds in this example, so that in the output signal (2) the pulse $P_1$ is coincident with the undelayed pulse $P_3$.

The signals (1) and (2) are applied to an "AND" gate or coincidence circuit 27 whereby there is an output, signal (3), in the case assumed where $P_1$ and $P_3$ have an 8 microsecond spacing.

Even if the pulses $P_1$ and $P_3$ have the correct time spacing of 8 microseconds, the transponder should not reply unless the amplitude of $P_3$ is greater than the amplitude of $P_1$ or, in accordance with the present example, some selected fraction of the amplitude of $P_1$. In the present example, referring to pulse amplitude at the input of the log amplifier, this selected fraction is one-half, or stated differently, the selected fractional amplitude is 6 decibels down from the peak amplitude of $P_1$ at the log amplifier input. Therefore, an amplitude comparison of $P_1$ and $P_3$ is made as will now be described.

The output (3) of the coincidence circuit 27 is supplied to a generator 28 for producing a gating or control pulse (4) which, in this example, is of 2.5 microseconds duration. The generator 28 may be a blocking oscillator, for example. The gating pulse (4) performs two functions: it enables a pulse stretcher, and it gates the output of an amplitude comparator to the reply coder.

A pulse stretcher 29 has the gating pulse (4) applied to it to enable it for the duration of the gating pulse. The pulse $P_1$ is the pulse that is to be stretched to insure a correct amplitude comparison. Therefore, the delayed pulse $P_1$ of signal (2) is applied to the pulse stretcher 29, preferably with some additional delay such as provided, for example, by a 0.5 microsecond delay line 31 so that the pulse applied to the stretcher 29 is represented by the signal (5). The reason for an additional relay, such as 0.5 microsecond, is to insure that the gating pulse (4) has the stretcher 29 enabled before the pulse $P_1$ appears at the stretcher.

The stretched pulse $P_1$ appears at the output of stretcher 29 as the signal (6) and is applied to an amplitude comparator 33. It is to be compared with the pulse $P_3$. Therefore, the signal (1) is applied through a delay circuit 34, such as a 1 microsecond delay line, so that the delayed pulse $P_3$, represented by signal (7), is present at the amplitude comparator 33 at the same time as the stretched pulse $P_1$ which brackets it. Small timing errors such as pulse position tolerance, delay line tolerance, and pulse jitter will not affect the operation so long as $P_3$ remains bracketed by stretched $P_1$.

The amplitude comparator 33 is biased in one direction by a voltage equivalent to 6 db. The primary reason for this is to allow the acceptance of pulse $P_3$ when it is about 6 db below pulse $P_1$, referring to pulse amplitudes at the log amplifier input. A secondary reason is to preserve the timing information of the pulses. To this end, at the present time it is specified that the output trigger (reply trigger) should be referred to a half-amplitude point on the pulse $P_3$ or 6 decibels below the peak of the pulse as received by the transponder. Therefore, in the present example, when the pulses are of equal amplitude, the amplitude comparator switches and a reply trigger occurs at the 6 db or half-amplitude point on pulse $P_3$ as received by the transponder and as it appears at the log amplifier input.

As stated above, if the amplitude of $P_3$ exceeds a level 6 db below that of stretched $P_1$, there will be an amplitude comparator output represented by signal (8) which is fed to an "AND" gate 34. The gating pulse, represented by signal (4), is also applied to the "AND" gate 34. Therefore, a reply trigger pulse, represented by signal (9), will appear at the output of the "AND" gate 34 provided two conditions are met: first, the pulses $P_1$ and $P_3$ must have the code spacing for which the delay line 26 is set, namely, 8 microseconds in the example given so that gating pulse (4) is generated; second (referring to amplitudes of received pulses), the amplitude of $P_3$ must not be more than 6 db below that of the stretched $P_1$ so that there is an amplitude comparator output.

The reply trigger pulse (9) is supplied to a coder 36 which produces a coded signal, such as a series of code spaced pulses. The coded signal is supplied to the transmitter 22 for the reply transmission.

FIG. 1c shows, by way of example, details of a suitable pulse stretcher, a suitable amplitude comparator, and a suitable "AND" gate that may be used in the transponder of FIG. 1a. Capacitor and resistor values are given merely as illustrative. The capacity values are in microfarads unless otherwise indicated. For the resistor values, K equals 1000 ohms. Thus a 1K resistor is a 1000 ohm resistor.

The pulse stretcher 29 comprises a transistor $T_1$ to the base of which the pulse $P_1$, signal (5), is applied. In order to stretch the pulse, a 220 micro-microfarad capacitor is connected between the emitter of $T_1$ and ground. The emitter circuit also includes a transistor $T_2$ which is normally conducting to discharge the 220 $\mu\mu f$. capacitor. However, transistor $T_2$ becomes non-conducting for the duration of the gating pulse (4) since the gating pulse is applied with positive polarity to the base of $T_2$. A diode 30 is connected between the emitter of $T_2$ and plus 4 volts so that the emitter is clamped to plus 4 volts as the emitter goes toward plus 25 volts because of decreasing transistor current upon application of the gating pulse, thus making possible the use of a smaller amplitude gating pulse. Thus, the stretcher is enabled so that when pulse $P_1$ appears an instant later at the base of $T_1$, the 220 $\mu\mu f$. capacitor is quickly charged to full pulse voltage, and it holds this charge until the termination of the gating pulse (4). Thus, the stretched pulse $P_1$ is obtained. When $T_2$ is conducting, the diode 90 holds the collector at ground so that the current through $T_2$ will be supplied by the diode instead of through the transistor $T_1$ Stretched pulse $P_1$, signal (6), is passed through isolating emitter follower transistors $T_3$ and $T_4$, and through a coupling capacitor 41 to the amplitude comparator 33.

The amplitude comparator is a difference amplifier comprising transistors $T_5$ and $T_6$, and a transistor $T_7$ that is common to their emitter circuits and is normally conducting to produce a constant current source for the difference amplifier.

In this example, the 6 db bias is 2.5 volts positive applied to the base of transistor $T_5$ along with the stretched pulse $P_1$. This 2.5 volt bias corresponds to a 6 db difference at the input of the log amplifier. Pulse $P_3$, signal (7), is applied to the base of transistor $T_6$. Thus, for equal-amplitude input pulses, the instantaneous voltages at the bases of transistors $T_5$ and $T_6$ are equal when the 6 db down amplitude of pulse $P_3$ is equal to the peak amplitude of stretched pulse $P_1$. When the amplitude of $P_3$ equals the amplitude of $P_1$ (referring to the pulses as received by the transponder), the output signal (8) appears at the collector of $T_6$ at a time corresponding to the 6 db down point on $P_3$ and is applied to the "AND" gate 34. If $P_3$ is more than 6 db below the amplitude of $P_1$, no output (8) occurs. Since the theory of operation of difference amplifiers is well known, no detailed description of operation is required. However, it may be noted that the common emitter potential is established by the most negative of the two base potentials. The transistor with the most negative base potential is the one that conducts.

The "AND" gate 34 comprises transistors $T_8$ and $T_9$ which have a common emitter output. When both transistors are cut off, a reply trigger pulse appears across the 5K output resistor. The amplitude comparator output, signal (8), is applied to the base of transistor $T_8$. The gating pulse, signal (4), is applied to the base of $T_9$. When signals (8) and (4) appear simultaneously on the "AND" gate, the amplitude comparator output is gated through as the reply trigger (9).

Figure 2B:
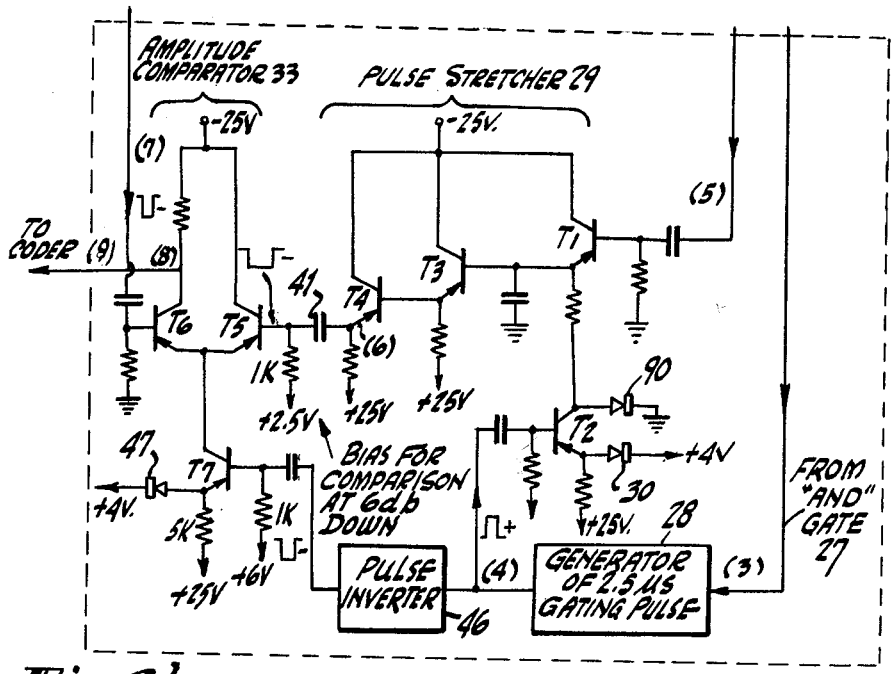

The embodiment of the invention shown in FIGS. 2a and 2b is the same as that just described except that the amplitude comparator 33 is normally inoperative and is gated into operative condition by the 2.5 microsecond gating pulse. Because the amplitude comparator 33 is gated, the "AND" gate 34 is omitted. The various voltage pulses or signals indicated by numerals (1) through (9) are the same as shown in FIG. 1b. An advantage in gating the amplitude comparator is that it reduces the power dissipation in the comparator transistors.

Referring to FIGS. 2a and 2b, gating signal (4) from gating pulse generator 28 is inverted by pulse inverter 46 which applied a negative gating pulse to the amplitude comparator 33. As shown in FIG. 2b, transistor $T_7$ of the amplitude comparator normally is held cut off by suitable biasing. In the example shown, the base of $T_7$ is biased at plus 6 volts, and plus 4 volts for clamping is connected to the emitter through a diode 47. When the negative 2.5 microsecond gating pulse occurs, $T_7$ is turned on and the amplitude comparator 33 is rendered operative for the duration of the gating pulse. If, as previously discussed, the amplitude of $P_3$ is not more than 6 db below the amplitude of $P_1$ (referring to amplitudes of transponder received pulses), the output signal (8) appears at the collector of $T_6$. This output signal (8) in this embodiment is also the reply trigger (9).

As in the first embodiment of the invention, the two pulses $P_1$ and $P_3$ must have both the correct code spacing and the correct relative amplitudes before a reply trigger is produced.

Figure 3A:
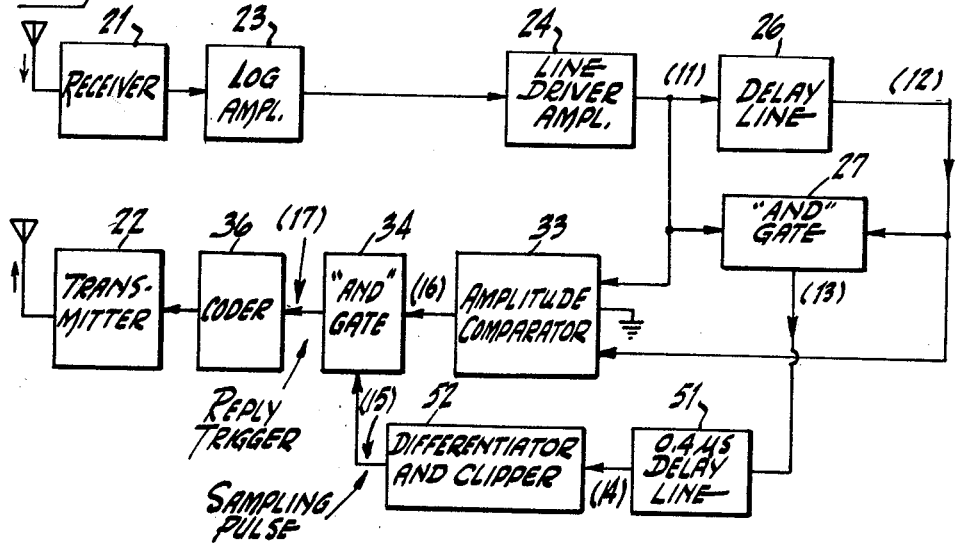
FIG. 3a is a block diagram of a transponder embodying a decoder constructed in accordance with still another embodiment of the invention.
Figure 3B:
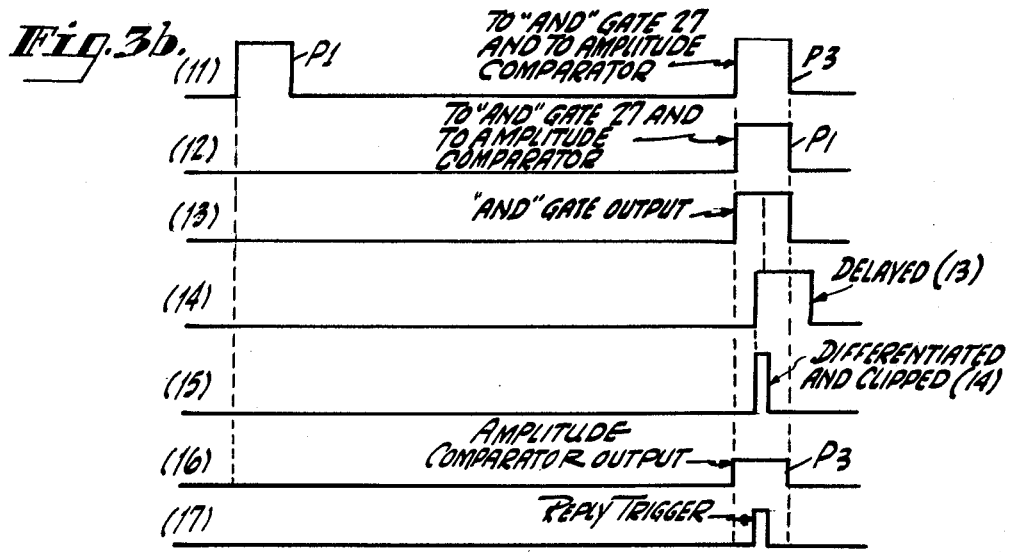
Figure 3C:
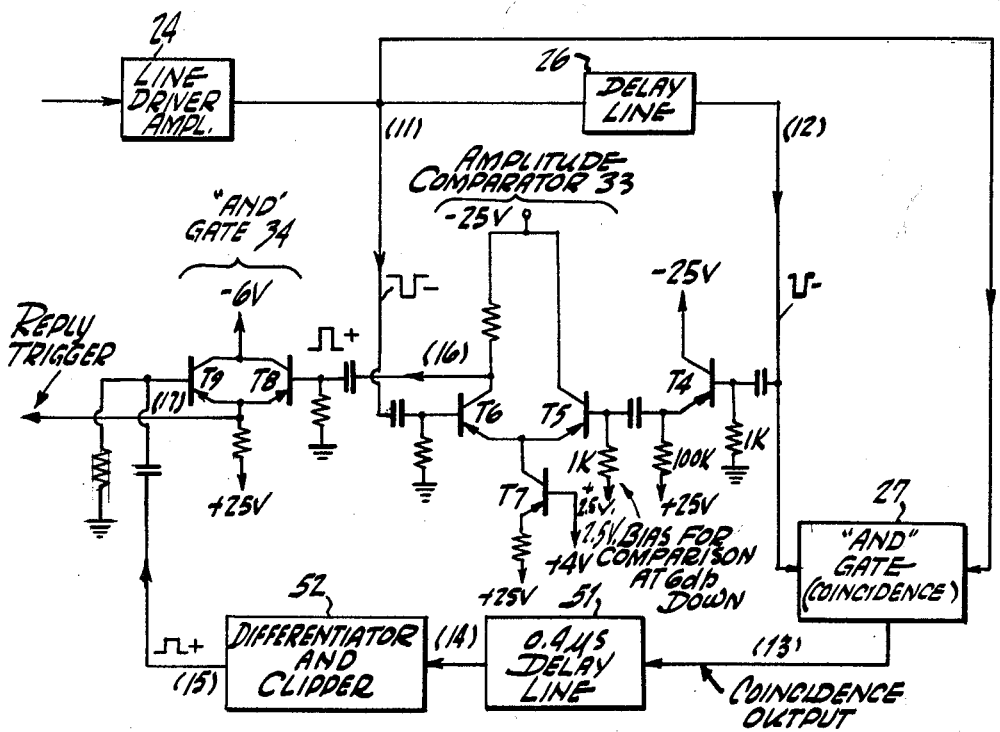

Another embodiment of the invention is illustrated in FIGS. 3a and 3c, and in FIG. 3b which shows the pulse voltages or signals (11) through (17) that appear at various points in the circuit. For the sake of clarity all the pulses are shown in FIG. 3b as having the same polarity. In the actual circuit the pulse polarities differ from one point to another. In this embodiment the pulse stretcher is not employed. Instead, to insure a correct amplitude comparision, the output of the amplitude comparator is sampled while the two pulses are being compared, and at a time that avoids any sampling near the beginning or termination of a pulse where a pulse is not at full amplitude, or where one pulse has started or terminated before the other pulse due to timing errors in the interrogation pulses or delay line.

Referring to FIGS. 3a, 3b, and 3c, the same interrogation signal comprising pulses $P_1$ and $P_3$ is assumed as in the previously described embodiments. The two pulses have a code spacing of 8 microseconds and a duration or width of about 1 microsecond. The signals (11) and (12) are applied to the amplitude comparator for a comparison of $P_1$ and $P_3$.

As shown in FIG. 3c, the amplitude comparator 33 is the same as in the first described embodiment (FIG. 1c), transistor $T_7$ always being conducting. The signal (12) is applied to the base of transistor $T_5$ through an isolating emitter follower transistor $T_4$.

If, referring to the amplitudes of pulses as received by the transponder, the amplitude of pulse $P_3$ exceeds that of the pulse $P_1$ minus the bias which sets the level difference at which comparison is desired, there will be a comparator output corresponding to pulse $P_3$ as represented by signal (16). This output is supplied to the "AND" gate 34 where it is passed only during the occurrence of a sampling or control pulse, represented by signal (15), which also is supplied to "AND" gate 34.

The sampling pulse (15) is generated in response to an output from the coincidence circuit 27. If the pulses $P_1$ and $P_3$ have the code time spacing, as assumed, for which the delay line 26 is set, the output from the coincidence circuit or "AND" gate 27 will be as represented by signal (13). One satisfactory way to generate the sampling pulse (15) is to delay the signal (13) by about 0.4 microsecond (i.e., about one-half the width of the pulses), for example, by a delay line 51 to obtain delayed pulse (14), and then differentiate the pulse (14), and clip off the negative going portion of the resulting wave by a differentiating and clipping circuit 52 to obtain the positive sampling pulse (15). Thus, there is obtained a sampling pulse that occurs at about the middle of the width of the pulse $P_3$ appearing at the amplitude comparator output.

A reply trigger, as represented by signal (17), is produced when, and only when, the pulses $P_1$ and $P_3$ have the code spacing for which the delay line 26 is set, and also have the correct relative amplitudes. In this embodiment the timing is not as exact as in the previously described embodiments because the leading edge of the sampling pulse (15), and hence the leading edge of the reply trigger, does not necessarily coincide with the half-amplitude (6 db) point on pulse $P_3$ when pulses $P_1$ and $P_3$ are of equal amplitude.

FIG. 4 illustrates how the invention may be employed for sidelobe suppression in a transponder that is to be interrogated by a three pulse code consisting of interrogation pulses $P_1$ and $P_3$, and a control pulse $P_2$. The pulses $P_1$ and $P_3$ are radiated from a directive antenna. The pulse $P_2$ is radiated from an omni-directional antenna for the purpose of side lobe suppression. The transponder is not to reply unless the pulse $P_1$ has an amplitude greater than that of the control pulse $P_2$. In FIG. 4, the pulses $P_1$ and $P_2$ are compared as to time coincidence and as to amplitude.

Referring to FIG. 4, the circuit is the same as that shown in FIG. 3c except for the following: The delay line 26' is set for a two microsecond delay which is the time spacing of $P_1$ and $P_2$; the output from the amplitude comparator is taken from the collector of transistor $T_5$; and, in the example shown, neither side of the amplitude comparator is biased.

In operation the delayed pulse $P_1$ appears on the base of $T_5$ at the same time that the undelayed pulse $P_2$ appears on the base of $T_6$. Only if $P_1$ has the larger amplitude, does an output pulse appear at the collector of $T_5$ and on the output lead of the "AND" gate 34. This output pulse may then be used in cooperation with pulse $P_3$ (by means of a decoder channel not shown) to trigger a reply pulse.

The circuit of FIG. 4 may be used in another way when the interrogation is by the above-described three pulse code. In this case the circuit is to be used to trigger a "kill" pulse for the pulse $P_3$ when the amplitude of control pulse $P_2$ is greater than that of $P_1$. For this use the circuit is the same as shown in FIG. 4 except that the amplitude comparison is taken off the collector of $T_6$ (the same as in FIG. 3c). Now, if the amplitude of $P_2$ is greater than that of $P_1$ an output pulse appears on the output lead of "AND" gate 34. This output pulse may be used to trigger the generation of a "kill" pulse which occurs during the occurrence of $P_3$. The "kill" pulse may be applied to a decoding channel (not shown) which will decode the interrogation pulses $P_1$ and $P_3$ of the three pulse code supplied thereto. The "kill" pulse is applied with a polarity to block the decoding channel whereby the pulse $P_3$ will not pass to the decoder; thus no reply trigger will be produced.

The "kill" pulse may also be a long pulse of a duration such as 25 microseconds which will suppress any echoes occurring in the 25 microsecond period following $P_1$ and $P_2$, in addition to breaking the code by suppressing $P_3$.

The circuit of FIG. 4 may also be used when pulses $P_2$ and $P_3$ constitute the interrogation pulses and $P_1$ is the control pulse. In this case a reply is required when $P_2$ is greater in amplitude than $P_1$. The amplitude comparator output is taken from the collector of $T_5$. Now, if the amplitude of $P_1$ is greater than that of $P_2$ (the "no reply" condition), an output pulse appears on the output lead of "AND" gate 34. As described in the previous paragraph, this output pulse may be used to trigger the generation of a "kill" pulse which commences before $P_3$ occurs and continues until at least the end of $P_3$.

What is claimed is:

1. Apparatus for producing an output signal in response to the reception of a pair of pulses having a predetermined time spacing and having a predetermined relative amplitude relation, said apparatus comprising means for comparing the amplitudes of said pulses and for producing an output pulse only when said pulses have substantially said predetermined relative amplitude relation, means for producing a coincidence output pulse when said pair of pulses have said predetermined time spacing, said apparatus having an output lead, and means for causing a pulse to appear on said output lead in response to the occurrence of both said coincidence output pulse and said output pulse of the comparing means.

2. Decoding apparatus for producing an output in response to the reception of a pair of pulses having a predetermined time spacing and having a predetermined relative amplitude relation, said apparatus comprising coincidence circuit means for producing a coincidence output pulse in response to reception of a pair of pulses having said predetermined time spacing, an amplitude comparator, means for applying to said comparator approximately simultaneously a pair of pulses having relative amplitudes corresponding substantially to the logarithm of the relative amplitudes of said received pair of pulses, said amplitude comparator producing a comparator output only when a predetermined one of said pulses has a given amplitude relationship to the other pulse, means for producing a control pulse in response to the occurrence of said coincidence output, said decoding apparatus having an output lead, and means responsive to the occurrence of said control pulse for causing at least a portion of the comparator output to appear on said output lead.

3. Decoding apparatus for producing an output in response to the reception of a pair of pulses having a predetermined time spacing and having a predetermined relative amplitude relation, said apparatus comprising coincidence circuit means for producing a coincidence output in response to reception of a pair of pulses having said predetermined time spacing, an amplitude comparator, means for applying to said comparator approximately simultaneously a pair of pulses having relative amplitudes corresponding substantially to the logarithm of the relative amplitudes of said received pair of pulses, one of said pulses being a stretched pulse, said amplitude comparator producing a comparator output only when a predetermined one of said pulses has a predetermined amplitude relationship with respect to the other pulse, means for producing a gating pulse in response to the occurrence of said coincidence output, said decoding apparatus having an output lead, and means responsive to the occurrence of said gating pulse for causing the comparator output to appear on said output lead.

4. Decoding apparatus for producing an output in response to the reception of a pair of pulses having a predetermined time spacing and having a predetermined relative amplitude relation, said apparatus comprising coincidence circuit means for producing a coincidence output in response to reception of a pair of pulses having said predetermined time spacing, an amplitude comparator, means for applying to said comparator approximately simultaneously a pair of pulses having relative amplitudes corresponding substantially to the logarithm of the relative amplitudes of said received pair of pulses, said amplitude comparator producing a comparator output only when a predetermined one of said pulses has a predetermined amplitude relationship with respect to the other pulse, means for producing in response to the occurrence of said coincidence output a sampling pulse that is narrow as compared with the width of each of said pulses of said pair, said decoding apparatus having an output lead, and means responsive to the occurrence of said sampling pulse for causing a portion of the comparator output to appear on said output lead.

5. Decoding apparatus for producing an output in response to the reception of a pair of pulses having a predetermined time spacing and having a predetermined relative amplitude relation, said apparatus comprising coincidence circuit means for producing a coincidence output in response to reception of a pair of pulses having said predetermined time spacing, an amplitude comparator which is normally inactive, means for applying to said comparator approximately simultaneously a pair of pulses having relative amplitudes corresponding substantially to the logarithm of the relative amplitudes of said received pair of pulses, said amplitude comparator producing a comparator output only when a predetermined one of said pulses has a predetermined amplitude relationship with respect to the other pulse and only when said amplitude comparator is activated, means for producing a control pulse in response to the occurrence of said coincidence output, said decoding apparatus having an output lead, and means for activating said comparator in response to the occurrence of said control pulse, and for the duration thereof, for causing at least a portion of the comparator output to appear on said output lead.

6. Apparatus for producing an output signal in response to the reception of a pair of pulses having a predetermined time spacing and having a predetermined relative amplitude relation, said apparatus comprising means for comparing the amplitudes of said pulses and for producing an output when said pulses have said predetermined relative amplitude relation, means for producing a coincidence output when said pair of pulses have said predetermined time spacing, means for producing a sampling pulse in response to the occurrence of said coincidence output, said sampling pulse being narrow as compared with the width of the pulses of said pair, said apparatus having an output lead, and means for supplying the output of said amplitude comparing means to said output lead in response to the occurrence of said sampling pulse.

7. Apparatus for producing an output signal in response to the reception of a pair of pulses having predetermined time spacing and having a predetermined relative amplitude relation, said apparatus comprising means for comparing the amplitudes of said pulses and for producing an output when said pulses have said predetermined relative amplitude relation, means for producing a coincidence output pulse when said pair of pulses have said predetermined time spacing, means for producing a sampling pulse in response to the occurrence of said coincidence output pulse, said sampling pulse being narrow as compared with the width of the pulses of said pair, an "AND" gate, means for supplying the output of said amplitude comparing means to said "AND" gate, and means for supplying said sampling pulse to said "AND" gate whereby the output of said amplitude comparing means appears as the output of said "AND" gate in response to the occurrence of said sampling pulse.

8. Apparatus for producing an output signal in response to the reception of a pair of pulses having a predetermined time spacing and having a predetermined relative amplitude relation, said apparatus comprising means for delaying said received pulses by an amount equal to said predetermined time, a normally inactive pulse stretcher, means for applying said delayed pulses to said pulse stretcher, a coincidence circuit, means for applying said delayed pulses and the received undelayed pulses to said coincidence circuit whereby there is a coincidence output pulse if the received pulses have said predetermined time spacing, means for generating a gating pulse in response to the occurrence of said coincidence output, means for applying said gating pulse to said pulse stretcher to activate it whereby the first occurring of said pair of pulses is stretched, an amplitude comparator, means for applying said stretched pulse to said comparator, means for also applying the second occurring of the received pair of pulses to said comparator, said comparator producing a comparator output only when a predetermined one of the pulses applied thereto has a given amplitude relationship with respect to the other pulse, said apparatus having an output lead, and means responsive to the occurrence of said gating pulse for causing the comparator output to appear on said output lead.

9. Apparatus for producing an output signal in response to the reception of a pair of pulses having a predetermined time spacing and having a predetermined relative amplitude relation, said apparatus comprising means for delaying said received pulses by an amount equal to said predetermined time, a normally inactive pulse stretcher, means for applying said delayed pulses to said pulse stretcher, a coincidence circuit, means for applying said delayed pulses and the received undelayed pulses to said coincidence circuit whereby there is a coincidence output if the received pulses have said predetermined time spacing, means for generating a gating pulse in response to the occurrence of said coincidence output, means for applying said gating pulse to said pulse stretcher to activate it for the duration of said gate pulse whereby the first occurring of said pair of pulses is stretched, an amplitude comparator, means for applying said stretched pulse to said comparator, means for also applying the second occurring of the received pair of pulses to said comparator after delaying it by an amount sufficient to make it occur simultaneously with the middle portion of the stretched pulse, said comparator producing a comparator output only when a predetermined one of the pulses applied thereto has a predetermined ampitude relationship with respect to the other pulse, said apparatus having an output lead, and means responsive to the occurrence of said gating pulse for causing the comparator output to appear on said output lead.

10. Apparatus for producing an output signal in response to the reception of a pair of pulses having a predetermined time spacing and having a predetermined relative amplitude relation, said apparatus comprising means for delaying said received pulses by an amount equal to said predetermined time, a normally inactive pulse stretcher, means for applying said delayed pulses to said pulse stretcher, a coincidence circuit, means for applying said delayed pulses and the received undelayed pulses to said coincidence circuit whereby there is a coincidence output pulse if the received pulses have said predetermined time spacing, means for generating a gating pulse in response to the occurrence of said coincidence output pulse, means for applying said gating pulse to said pulse stretcher to activate it for the duration of said gating pulse whereby the first occurring of said pair of pulses is stretched, a normally inactive amplitude comparator, means for applying said stretched pulse to said comparator, means for also applying the second occurring of the received pair of pulses to said comparator after delaying it by an amount sufficient to make it occur simultaneously with the middle portion of the stretched pulse, said comparator producing a comparator output only when a predetermined one of the pulses applied thereto has a predetermined amplitude relationship with respect to the other pulse, and means for applying said gating pulse to said amplitude comparator to activate it so that it may produce an output.

11. Apparatus for producing an output signal in response to the reception of a pair of pulses having a predetermined time spacing and having a predetermined relative amplitude relation, said apparatus comprising means for delaying said received pulses by an amount equal to said predetermined time, a normally inactive pulse stretcher, means for applying said delayed pulses to said pulse stretcher, a coincidence circuit, means for applying said delayed pulses and the received undelayed pulses to said coincidence circuit whereby there is a coincidence output if the received pulses have said predetermined time spacing, means for generating a gating pulse in response to the occurrence of said coincidence output, means for applying said gating pulse to said pulse stretcher to activate it for the duration of said gating pulse whereby the first occurring of said pair of pulses is stretched, an amplitude comparator, means for applying said stretched pulse to said comparator, means for also applying the second occurring of the received pair of pulses to said comparator after delaying it by an amount sufficient to make it occur simultaneously with the middle portion of the stretched pulse, said comparator producing a comparator output only when a predetermined one of the pulses applied thereto has a predetermined amplitude relationship with respect to the other pulse, an "AND" gate, means for supplying said comparator output to said "AND" gate, and means for supplying said gating pulse to said "AND" gate for causing the comparator output to appear at the output of said "AND" gate.

12. Decoding apparatus for producing an output in response to the reception of a pair of pulses having a predetermined time spacing and having a predetermined relative amplitude relation, said apparatus comprising coincidence circuit means for producing a coincidence output pulse in response to reception of a pair of pulses having said predetermined time spacing, an amplitude comparator, means for applying to said comparator approximately simultaneously a pair of pulses having relative amplitudes corresponding substantially to the logarithm of the relative amplitudes of said received pair of pulses, said amplitude comparator producing a comparator output only when a predetermined one of said pulses has a given amplitude relationship to the other pulse, said decoding apparatus having an output lead, and means responsive to the occurrence of both said coincidence output pulse and said comparator output for causing a pulse to appear on said output lead.

13. Decoding apparatus for producing an output in response to the reception of a pair of pulses having a predetermined time spacing and having a predetermined relative amplitude relation, said apparatus comprising coincidence circuit means for producing a coincidence output in response to reception of a pair of pulses having said predetermined time spacing, an amplitude comparator having two input circuits and an output circuit, means for applying to said comparator input circuits, respectively, approximately simultaneously a pair of pulses having relative amplitudes corresponding substantially to the logarithm of the relative amplitudes of said received pair of pulses, means for applying a bias voltage to one of said input circuits to set the level difference at which the amplitude comparison is desired, said amplitude comparator producing a comparator output at its output circuit only when a predetermined one of said pulses has a predetermined amplitude relationship with respect to the other pulse, said decoding apparatus having an output lead, and means responsive to the occurrence of both said coincidence output and said comparator output for causing a pulse to appear on said output lead.

14. Decoding apparatus for producing an output in response to the reception of a pair of pulses having a predetermined time spacing and having a predetermined relative amplitude relation, said apparatus comprising coincidence circuit means for producing a coincidence output in response to reception of a pair of pulses having said predetermined time spacing, an amplitude comparator having two input circuits and an output circuit, means for applying to said comparator input circuits, respectively, approximately simultaneously a pair of pulses having relative amplitudes corresponding substantially to the logarithm of the relative amplitudes of said received pair of pulses, means for applying a bias voltage to one of said input circuits to set the level difference at which the amplitude comparison is desired, said bias voltage being substantially equal to the voltage change in the pulses applied to said comparator resulting from a 6 db change in the received signal, said amplitude comparator producing a comparator output at its output circuit only when a predetermined one of said pulses has a predetermined amplitude relationship with respect to the other pulse, said decoding apparatus having an output lead, and means responsive to the occurrence of both said coincidence output and said comparator output for causing a pulse to appear on said output lead.

15. In apparatus for receiving a pair of pulses having a predetermined relative amplitude relation, an amplitude comparator and means for applying to said comparator approximately simultaneously a pair of pulses having relative amplitudes corresponding substantially to the logarithm of the relative amplitudes of said received pair of pulses, said amplitude comparator producing a comparator output only when a predetermined one of said pulses has a predetermined amplitude relationship with respect to the other pulse.

16. In apparatus for receiving a pair of pulses having a predetermined relative amplitude relation, an amplitude comparator having two input circuits and an output circuit, and means for applying to said comparator input circuits, respectively, approximately simultaneously a pair of pulses having relative amplitudes corresponding substantially to the logarithm of the relative amplitudes of said received pair of pulses, means for applying a bias voltage to one of said input circuits to set the level difference at which the amplitude comparison is desired, said amplitude comparator producing a comparator output only when a predetermined one of said pulses has a predetermined amplitude relationship with respect to the other pulse.

References Cited by the Examiner
UNITED STATES PATENTS

| | | | |
|---|---|---|---|
| 3,007,156 | 10/61 | Barber | 343—6.8 |
| 3,032,757 | 5/62 | Majerus | 343—6.8 |

CHESTER L. JUSTUS, *Primary Examiner.*